United States Patent
Smith et al.

(10) Patent No.: US 6,724,852 B1
(45) Date of Patent: Apr. 20, 2004

(54) FISSILE INTERROGATION USING GAMMA RAYS FROM OXYGEN

(75) Inventors: Donald Smith, Plainfield, IL (US); Bradley J. Micklich, Naperville, IL (US); Andreas Fessler, Mol (BE)

(73) Assignee: The United States of America as represented by the United States Department of Energy, Washington, DC (US)

( * ) Notice: Subject to any disclaimer, the term of this patent is extended or adjusted under 35 U.S.C. 154(b) by 31 days.

(21) Appl. No.: 09/799,571

(22) Filed: Mar. 7, 2001

(51) Int. Cl.[7] .................. G21G 1/00; G21N 23/00
(52) U.S. Cl. .................. 376/154; 376/156; 376/157; 376/194
(58) Field of Search ................. 376/154, 156, 376/157, 194

(56) References Cited

U.S. PATENT DOCUMENTS 4,645,935 A * 2/1987 Salaita ................. 250/390
5,247,177 A * 9/1993 Goldberg et al. ........ 250/358.1
5,251,240 A * 10/1993 Grodzins .................. 376/157

* cited by examiner

Primary Examiner—Jack Keith
(74) Attorney, Agent, or Firm—Bradley W. Smith; Mark P. Dvorscak; Paul A. Gottlieb

(57) ABSTRACT

The subject apparatus provides a means to identify the presence of fissionable material or other nuclear material contained within an item to be tested. The system employs a portable accelerator to accelerate and direct protons to a fluorine-compound target. The interaction of the protons with the fluorine-compound target produces gamma rays which are directed at the item to be tested. If the item to be tested contains either a fissionable material or other nuclear material the interaction of the gamma rays with the material contained within the test item with result in the production of neutrons. A system of neutron detectors is positioned to intercept any neutrons generated by the test item. The results from the neutron detectors are analyzed to determine the presence of a fissionable material or other nuclear material.

4 Claims, 1 Drawing Sheet

FISSILE INTERROGATION USING GAMMA RAYS FROM OXYGEN

CONTRACTUAL ORIGIN OF THE INVENTION

The United States Government has rights in this invention pursuant to Contract No. W-31-109-ENG-38 between the U.S. Department of Energy and the University of Chicago.

FIELD OF THE INVENTION

This invention is a method and instrument for the detection of fissile material and certain additional nuclear materials (NM) through non-destructive interrogation using gamma rays.

BACKGROUND OF THE INVENTION

There is an ongoing problem concerning the detection of contraband fissionable material and other nuclear materials (NM). The threat from these materials could be substantially reduced by the development of an effective, compact, transportable inspection system that could be used at critical locations such as border crossings and sensitive nuclear facilities.

Other technologies for the detection of clandestine fissile materials have been suggested. These include neutron-induced fission which involves the stimulated emission of neutrons by primary neutrons. The disadvantage with this suggested technique is the difficulty of differentiating the primary and secondary neutrons that is required to establish an unambiguous signal for the clandestine material. The concept of interrogation by photofission has also been suggested, but in these earlier approaches the implementation is based on a continuum bremmstrahlung spectrum generated by an electron linac. With this technique, most of the gamma-ray dose comes from energies below the photo-fission or photo-neutron emission thresholds. So, such a device involves a high radiation dose to the object being interrogated and to the environment with corresponding low contraband material detection efficiency associated with each gamma-ray generated. If the linac is operated at higher voltages to improve the yield of effective gamma-rays, it is easy to exceed the photo-neutron threshold for benign materials; thereby leading to a false positive signal. The subject invention does not suffer these limitations. With the subject invention protons are accelerated by a compact low-energy accelerator, $E_p \leq 4$ MeV. They impinge on a thick, stopping, stable target consisting of a pure fluorine compound, such as $CaF_2$, $MgF_2$, $AlF_3$, $SF_6$ etc., bonded to a thermally conducting backing or in gaseous form. An intense, nearly monoenergetic, high-energy gamma-ray source (6–7 MeV γ's) is established generating gamma rays via the $^{19}F(p,\alpha\gamma)^{16}O$ reaction. At the generated proton energies, no primary neutrons are emitted from the cited targets. For 6–7 MeV gamma ray energies, both photofission and photo-neutron reactions are feasible for actinide materials. The photofission leads to the production of prompt-fission neutrons (nu-bar≈2–3 per fission). Furthermore, other NM such as deuterium, lithium-6, and beryllium can also be detected through photo-neutron reactions which are energetically feasible at these gamma ray energies. Most benign materials will not respond to these particular gamma rays through the emission of neutrons. Therefore, observation of neutron events by a detector with a high degree of gamma-ray discrimination provides an unambiguous signal of these contraband materials.

Thus, the object of this invention is to provide an apparatus and method for the detection of fissionable material through non-destructive interrogation using gamma rays. This apparatus would also be capable of distinguishing the isotope uranium-235 (U-235, which is fissile) from uranium 238 (U-238, which is fissionable).

Additional advantages, objects and novel features of the invention will become apparent to those skilled in the art upon examination of the following and by practice of the invention.

SUMMARY OF THE INVENTION

To achieve the foregoing and other advantages, this invention is an apparatus and method for detecting fissionable material and other nuclear materials (NM) through non-destructive interrogation using gamma-rays. The gamma-rays are generated by directing accelerated protons at a Fluorine-compound target. The interaction of the protons with the target produces nearly monoenergetic, high energy gamma rays. These gamma rays impinge upon the item being interrogated. If the item of interest contains fissile or fissionable material or other nuclear material, neutrons are produced by photo-fission and/or photo-neutron reactions. Neutron detectors are placed at specific locations in relation to the item being interrogated. If the detectors register the presence of neutrons, that is a strong indication that the item contains either fissionable material or other nuclear material.

BRIEF DESCRIPTION OF THE DRAWINGS

The present invention is illustrated in the accompanying drawing where.

DETAILED DESCRIPTION OF THE INVENTION

Figure 1:
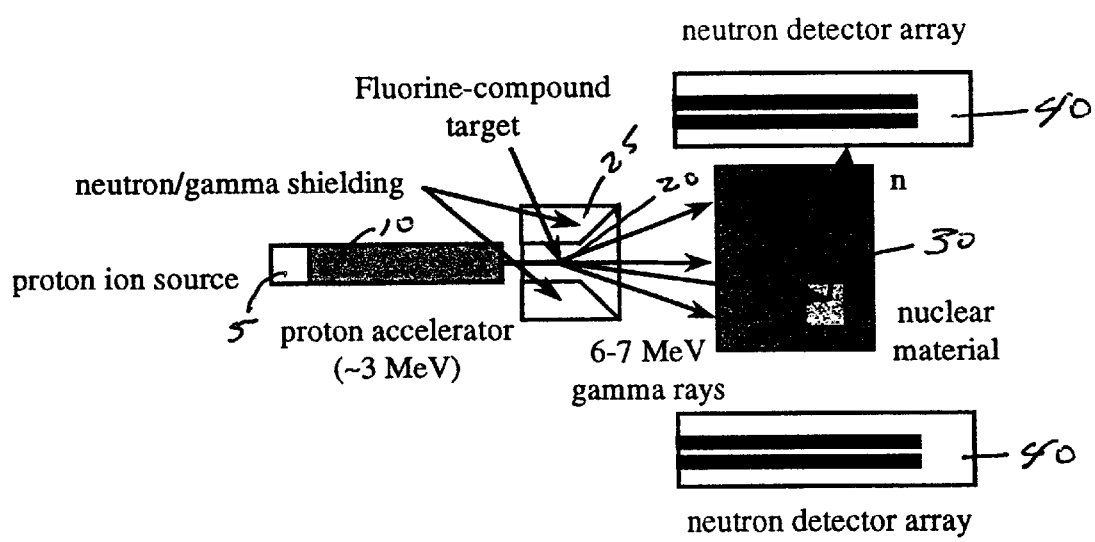
FIG. 1 is a schematic diagram of the detection apparatus.

FIG. 1 depicts a schematic of the apparatus for detecting fissionable material and other nuclear materials through non-destructive interrogation with gamma rays. Initially, protons are generated by a proton ion source 5 and then are accelerated by a low-energy accelerator 10 ($E_p \leq 4$ MeV). The accelerated protons are directed at a Fluorine-compound target 20 which is bonded to a thermally-conducting backing or is present in the gaseous form, and the target 20 is surrounded by neutron/gamma shielding 25. The impingement of the protons on the Fluorine-compound target results in the $^{19}F(p,\alpha\gamma)^{16}O$ reaction. This reaction, $^{19}F(p,\alpha\gamma)^{16}O$, is exothermic with a Q-value of 8.115 MeV. The reaction proceeds via the population of excited levels of the compound nucleus $^{20}Ne$ which have large α-particle decay widths to excited states of $^{16}O$. This takes place through the emission of five alpha groups. The second, third, and fourth excited states of $^{16}O$ de-excite almost exclusively by the emission of gamma rays with energies of 6.129, 6.917, and 7.116 MeV, respectively. Thus, the $^{19}F(p,\alpha\gamma)^{16}O$ reaction produces nearly monoenergetic, high-energy gamma rays of 6–7 MeV.

These gamma rays are sufficiently energetic to produce neutrons by photofission and/or photo-neutron reactions in fissionable material (e.g., uranium and plutonium), as the reaction thresholds are in the range of 5.5–6.0 MeV. In addition, these gamma rays will induce neutron emission from non-fissionable nuclear materials (e.g., deuterium, lithium-6 and beryllium). The (γ,n) thresholds are about 2.22, 5.66, and 1.67 MeV respectively for these three nuclides. However, these 6–7 MeV gamma rays do not have sufficient energy to produce photo-neutrons from common benign materials. This results in a low neutron background and means that a DC accelerator can be used rather than a pulsed one since it is not required to count delayed fission neutrons between pulses.

Because the system could operate in the DC mode which would not require a time and energy determination, a simple neutron detection system 40 such as an array of moderated $BF_3$ or $^3He$ counters could be used to detect the neutrons released from the object being examined 30. In the preferred embodiment, $BF_3$ counters were used because the energy released in the $^{10}B(n,\alpha)^7Li$ reaction is greater than that released in the $^3He(n,p)^3H$ reaction, thus, allowing better rejection of low-energy gamma events and noise. In a test run, the neutron detector 40 consisted of 19 $BF_3$ tubes mounted in three rows in a polyethylene moderating assembly. The output from all of the tubes in a given row were summed and recorded as a pulse height spectrum for analysis. In the alternative, to form a somewhat more mobile system just one row of tubes could be used with a discriminator and scalar.

The target 20 used to produce the 6–7 MeV gamma rays from the $^{19}F(p,\alpha\gamma)^{16}O$ reaction should have certain desirable characteristics: good mechanical strength and thermal conductivity to enable the target to sustain significant beam currents at typical operating proton energies (up to 100 microamperes at 4 MeV or the equivalent of 400 W of beam power) for an extended period of time with no significant deterioration and minimal production of unwanted background neutrons from (p,n) reactions. The fluorine-compound target ultimately selected as the most favorable was a gas target of $SF_6$ where the gas is contained in a stainless steel container having a thin aluminum window to permit the passage of the protons into the chamber allowing for interaction with the $SF_6$ gas. Mono-isotopic aluminum has a relatively high (p,n) reaction threshold (5.804 MeV) and also has desirable thermal and mechanical properties. Aluminum foil windows of both 15 and 20 microns thickness have been used with considerable success, with low neutron background and stable operation for extended periods at 13–15 psia and proton beam currents up to 4 $\mu A$. However, these conditions are not fundamental limitations, so a target system capable of handling more severe operating conditions which might be experienced in the field is feasible. Commercially available accelerators routinely operate with gas targets capable of handling over 100 microamperes of proton current at 3–4 MeV proton energy.

Due to Aluminum's high (p,n) threshold, 0.1 mm thick aluminum was used to line the existing gas cell walls, beam apertures, and collimators for reduction of neutron background. The only region of the gas target assembly which was not protected from incident protons by the aluminum layer was the stainless steel beam stop at the end of the cell. However, calculations showed that the range of protons in $SF_6$ at 13 psia and 4.25 MeV proton energy is significantly smaller than the actual cell length. Therefore, it is highly unlikely that any energetic protons could reach the unprotected beam stop.

Another source of background neutrons occurs from (p,n) reactions at proton energies above their respective thresholds on the minor isotopes $^{13}C$, $^{18}O$, and $^{36}S$ which are found in the vicinity of the target. These neutrons appear to be produced primarily at the target 20 or gas cell 20 entrance. It was found that the effect of these neutrons on the detector system 40 could be reduced by a factor of 2–3 by placing hydrogenous shielding in the vicinity of the target 20 or the gas cell 20 entrance in such a way that neutrons from the interrogated sample 30 were not obstructed.

The invention can also be used to distinguish the isotope uranium-235 (a fissile isotope) from uranium-238 (a fissionable isotope), thereby, for example, providing a technique for distinguishing uranium that is highly enriched in the isotope U-235 (HEU) from that which is depleted in the isotope U-235 (DU). The ratio of 6 MeV to 7 MeV gamma rays can be adjusted by altering the energy of the protons incident on the fluorine target, favoring the production of the 6.13 MeV gamma rays at lower incident proton energies. Since the photoneutron thresholds in U-235 and U-238 are about 5.1 MeV and 6.15 Mev respectively, the 6.13 MeV gamma rays are not capable of generating photoneutrons in U-238. By irradiating an unknown sample and comparing the neutron counts normalized to gamma ray yield, one can determine the relative content of U-235 vs. U-238 in the sample.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

What is claimed is:

1. An apparatus for the detection of fissionable material and other nuclear material comprising:
   a proton source capable of supplying a plurality of protons;
   a low-energy proton accelerator having an $E_p \leq 4$ MeV where said proton accelerator accelerates said protons from said proton source;
   a means for directing said accelerated protons at a fluorine-compound target wherein said fluorine-compound target is $SF_6$ gas confined in a container;
   a test item where said test item is being examined for the presence of fissionable material or other nuclear material; and
   a neutron detector array.

2. The apparatus of claim 1 wherein said container is constructed of stainless steel with a thin aluminum window having a thickness to allow the passage of protons through said window.

3. The apparatus of claim 1 wherein said neutron detector array consists of a plurality of $BF_3$ neutron counters.

4. The apparatus of claim 3 wherein said detector array consists of 19 detector tubes mounted in three row in a polyethylene moderating assembly.

* * * * *